(12) United States Patent
Canberk et al.

(10) Patent No.: US 11,598,976 B1
(45) Date of Patent: *Mar. 7, 2023

(54) OBJECT RECOGNITION FOR IMPROVING INTERFACES ON AN EYEWEAR DEVICE AND OTHER WEARABLE AND MOBILE DEVICES

(71) Applicant: Snap Inc., Santa Monica, CA (US)

(72) Inventors: Ilteris Canberk, Marina Del Rey, CA (US); David Meisenholder, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/212,512

(22) Filed: Mar. 25, 2021

Related U.S. Application Data

(63) Continuation of application No. 16/276,903, filed on Feb. 15, 2019, now Pat. No. 11,175,516.

(60) Provisional application No. 62/635,875, filed on Feb. 27, 2018.

(51) Int. Cl.
| | | |
|---|---|---|
| *G06V 10/20* | (2022.01) | |
| *G02C 5/00* | (2006.01) | |
| *G06F 3/0484* | (2022.01) | |
| *H04N 5/225* | (2006.01) | |
| *G06F 3/0482* | (2013.01) | |

(52) U.S. Cl.
CPC ........... *G02C 5/003* (2013.01); *G06F 3/0482* (2013.01); *G06F 3/0484* (2013.01); *G06V 10/255* (2022.01); *H04N 5/2252* (2013.01); *H04N 5/2257* (2013.01)

(58) Field of Classification Search
CPC .... G06V 10/255; G06V 10/44; G06V 10/443; G06V 10/48; G06V 10/75; G06V 10/751; G06V 10/761; G06V 20/40; G06V 20/64; G06V 20/647
See application file for complete search history.

(56) References Cited

U.S. PATENT DOCUMENTS

| | | |
|---|---|---|
| 8,977,639 B2 | 3/2015 | Petrou et al. |
| 9,720,934 B1 | 8/2017 | Dube et al. |
| 10,198,671 B1 | 2/2019 | Yang et al. |
| 11,175,516 B1 * | 11/2021 | Canberk et al. ..... G06V 10/235 |
| 2011/0310227 A1 | 12/2011 | Konertz et al. |

(Continued)

*Primary Examiner* — Andrew W Johns
(74) *Attorney, Agent, or Firm* — Culhane Meadows PLLC; Stephen J. Weed

(57) ABSTRACT

A wearable or a mobile device includes a camera to capture an image of a scene with an unknown object. Execution of programming by a processor configures the device to perform functions, including a function to capture, via the camera, the image of the scene with the unknown object. To create lightweight human-machine user interactions, execution of programming by the processor further configures the device to determine a recognized object-based adjustment; and produce visible output to the user via the graphical user interface presented on the image display of the device based on the recognized object-based adjustment. Examples of recognized object-based adjustments include launch, hide, or display of an application for the user to interact with or utilize; display of a menu of applications related to the recognized object for execution; or enable or disable of a system level feature.

20 Claims, 10 Drawing Sheets

(56) References Cited

U.S. PATENT DOCUMENTS

| | | |
|---|---|---|
| 2013/0328926 A1 | 12/2013 | Kim et al. |
| 2016/0078278 A1 | 3/2016 | Moore et al. |
| 2019/0089898 A1 | 3/2019 | Kim et al. |
| 2019/0253611 A1 | 8/2019 | Wang et al. |
| 2020/0265613 A1 | 8/2020 | Yoon et al. |

\* cited by examiner

OBJECT RECOGNITION FOR IMPROVING INTERFACES ON AN EYEWEAR DEVICE AND OTHER WEARABLE AND MOBILE DEVICES

CROSS-REFERENCE TO RELATED APPLICATIONS

This application is a Continuation of U.S. application Ser. No. 16/276,903 filed on Feb. 15, 2019, which claims priority under 35 U.S.C. § 119(e) to U.S. Provisional Patent Application No. 62/635,875, filed Feb. 27, 2018, which applications are hereby incorporated herein by reference in their entireties.

TECHNICAL FIELD

The present subject matter relates to wearable devices, e.g., eyewear devices, and mobile devices, more particularly, to object recognition to bring up relevant applications or experiences on the wearable devices and mobile devices.

BACKGROUND

Wearable devices, including portable eyewear devices, such as smartglasses, headwear, and headgear, as well as mobile devices available today integrate image displays and cameras. Viewing and interacting with the displayed content on the devices can be difficult due to the small image display area available on the wearable device and mobile device.

For example, size limitations and the form factor of the image display of a wearable eyewear device and a mobile device can make navigation difficult to incorporate into the devices. The available area for placement of graphical user interface elements on the image display of the eyewear device and the mobile device is limited. Due to the small form factor of the eyewear device and mobile device, viewing, manipulating, and interacting with, displayed content on the image display is cumbersome. Finding an application can require multiple swipes, taps, and other finger gestures. Accordingly, a need exists to simplify user interactions with wearable devices, including eyewear devices, and mobile devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
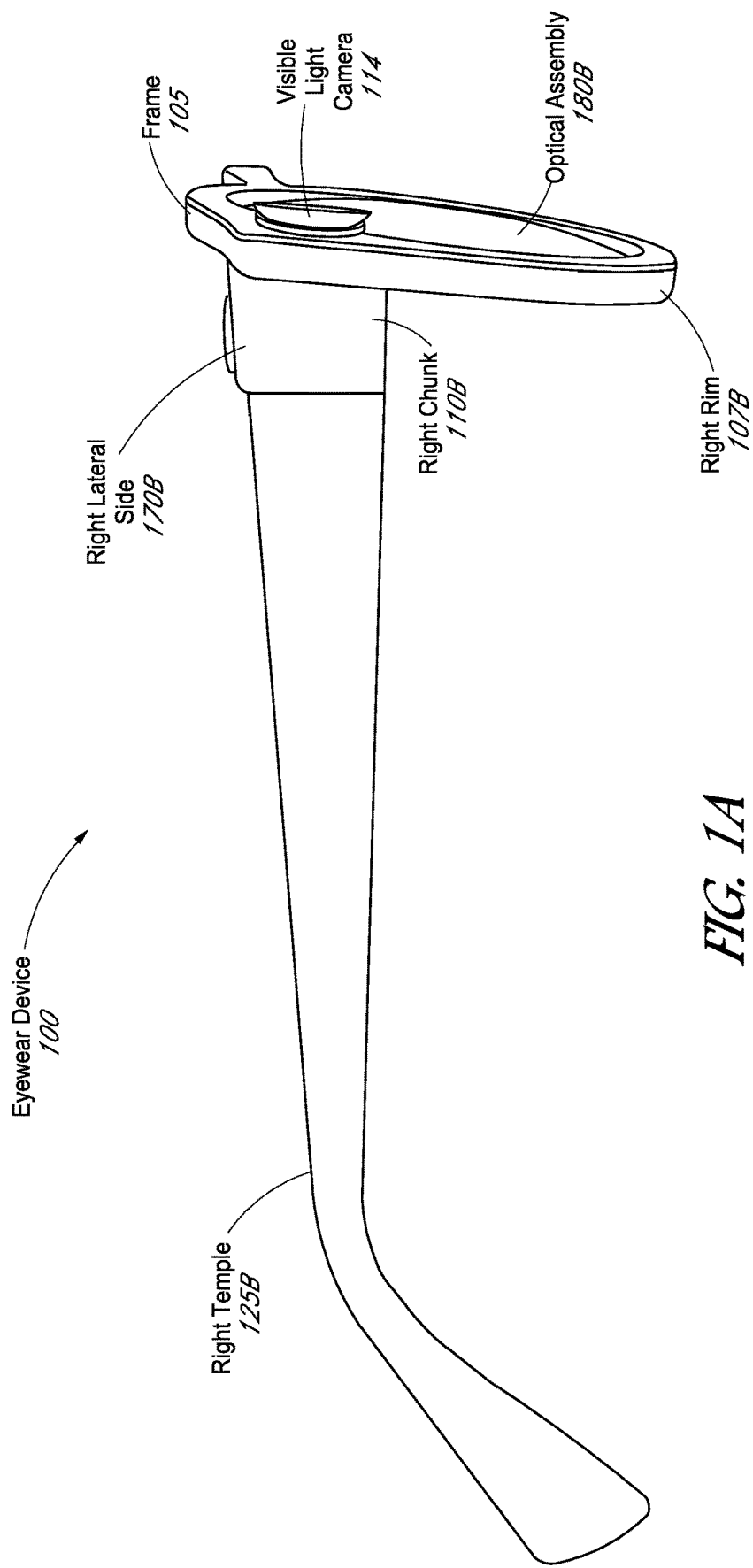
FIG. 1A is a side view of an example hardware configuration of an eyewear device, which includes a visible light camera on a chunk for object recognition to bring up relevant applications and experiences on the eyewear device.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a camera such as shown in any of the drawings, are given by way of example only, for illustration and discussion purposes. In operation for a particular object recognition programming, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any camera or component of a camera constructed as otherwise described herein.

In a first example, a system includes an eyewear device. The eyewear device includes a frame, a temple extending from a lateral side of the frame, and an image display to present a graphical user interface to a user. The eyewear device further includes a camera connected to the frame or the temple to capture an image of a scene with an unknown object. The system further includes a processor coupled to the eyewear device and connected to the camera, a memory accessible to the processor, and programming in the memory.

Execution of the programming by the processor configures the system to perform functions, including functions to capture, via the camera, the image of the scene with the unknown object. The execution of the programming by the processor further configures the system to determine a recognized object-based adjustment. The function to determine the recognized object-based adjustment includes extracting object features of the unknown object from the captured image of the scene. The unknown object features include a gradient, an edge, a contour, a ridge, a color, a corner, a blob, or a combination thereof.

The function to determine the recognized object-based adjustment further includes comparing the extracted unknown object features against a recognized object database to match the unknown object to a recognized object in the recognized object database. Each recognized object has a recognized object model that includes multiple recognized object features (e.g., hundreds or thousands). As explained herein, the object model is created based on distinct salient features that can be matched to recognize (e.g., uniquely identify) an object (e.g., smartglasses). The object model can be optimized such that only distinguishing features are stored to speed up runtime because storing too many or otherwise undistinguishing features requires extra processing time or power with little benefit to the object recognition process.

The function to determine the recognized object-based adjustment further includes retrieving the recognized object-based adjustment for the recognized object. The execution of the programming by the processor further configures the system to produce visible output to the user via the graphical user interface presented on the image display of the eyewear device based on the recognized object-based adjustment.

In a second example, a method includes capturing, via a camera, an image of a scene with an unknown object and determining a recognized object-based adjustment. The step of determining the recognized object-based adjustment includes extracting object features of the unknown object from the captured image of the scene. The unknown object features include a gradient, an edge, a contour, a ridge, a color, a corner, a blob, or a combination thereof. The step of determining the recognized object-based adjustment further includes comparing the extracted unknown object features against a recognized object database to match the unknown object to a recognized object in the recognized object database. Each recognized object has a recognized object model that includes multiple recognized object features. The step of determining the recognized object-based adjustment further includes retrieving a recognized object-based adjustment for the recognized object. The method further includes producing visible output to a user via a graphical user interface presented on an image display of a wearable device or a mobile device based on the recognized object-based adjustment.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view of an example hardware configuration of an eyewear device 100, which includes at least one visible light camera 114 on a right chunk 110B for object recognition to bring up relevant applications and experiences on the eyewear device 100 based on real world objects. When a real-world object is recognized, the recognized object is utilized as a clue to create smoother, and lighter-weight digital interactions with the user interface of the eyewear device 100, other wearable devices, or a mobile device. Object recognition techniques simplify core and operating system level actions, like launching applications on wearable and mobile devices, to enable the interaction between the user and the device to become extremely lightweight.

In the example of FIG. 1A, the visible light camera 114 is sensitive to the visible light range wavelength. As shown in the example, the visible light camera 114 has a front facing field of view from the perspective of a wearer. Examples of such a visible light camera 114 include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. Image sensor data from the visible light camera 114 is captured along with geolocation data, digitized by an image processor, and stored in a memory.

Visible light camera 114 may be coupled to an image processor (element 312 of FIG. 3) for digital processing along with a timestamp in which the image of the scene with the unknown object is captured. Image processor 312 includes circuitry to receive signals from the visible light camera 114 and process those signals from the visible light camera 114 into a format suitable for storage in the memory 334. The timestamp can be added by the image processor 312 or other processor, which controls operation of the visible light camera 114. A coupled processor 343 uses algorithms to detect and extract object features of the unknown object.

In an example, a system includes the eyewear device 100. The eyewear device 100 includes a frame 105, a right temple 125B extending from a right lateral side 170B of the frame 105, and an image display (e.g., optical assembly 180A-B shown in FIGS. 1B-C) to present a graphical user interface to a user. The eyewear device 100 further includes a camera (e.g., visible light camera 114) connected to the frame 105 or the right chunk 110B to capture an image of a scene with an unknown object. Although not shown in FIGS. 1A-C, the system further includes a processor (element 343 of FIG. 3) coupled to the eyewear device 100 and connected to the camera 114, a memory 334 accessible to the processor 343, and programming in the memory 334, for example in the eyewear device 100 itself or another part of the system.

Although not shown in FIG. 1A, the system also includes a host computer (element 398 of FIG. 3) that populates a recognized object database utilizing neural network programming. The neural network programming populates the recognized object database (e.g., trains the recognized object models) by learning features directly from sets of labeled image data without the need for manual feature extraction. The neural network programming executes on the host computer and outputs a model for each recognized object stored in the recognized object database. Specific keywords maybe inputted with labeled image data of the recognized objects to detect. As additional recognized objects are added, the recognized object database is updated along with a corresponding recognized object-based adjustment for the additional recognized objects.

As described in further detail below, the recognized object database, which stores training models of recognized objects (e.g., comprising hundreds or thousands of extracted recognized object features per recognized object), also resides on the eyewear device 100. The host computer 398 can transmit over the air updates to update the recognized object training models. Recognized object training models can also reside on a cluster of computers, with the combined training models stored on a central server to distribute the combined training models to devices.

In one example, a convolutional neural network (CNN) running on the host computer convolves learned features with input image data of scenes with unclassified objects. The CNN uses two-dimensional convolutional layers, making the CNN architecture well suited to process the two-dimensional image data. The CNN extracts features directly from images and is not pretrained. The CNN learns while the network trains on a collection of images of scenes with unclassified objects. This automated feature extraction makes the CNN highly accurate for object recognition.

During training of the neural network programming of the host computer, multiple images of scenes with unclassified objects from various angles with different perspectives, aerial, side, top, and lower elevation are fed into the host computer for processing. Images are also inputted with different lighting conditions and background scenes with the unclassified objects. Training the neural network examines multiple images and creates a recognized object model for the recognized object in the recognized object database. In an example, the neural network algorithm looks at edges of unclassified objects and every time a sudden change of color or intensity in a sub-section of a 3×3 or 9×9 matrix of pixels occurs a feature is extracted of the object. When a large gradient change is detected, the neural network algorithm detects an edge feature. Training also checks whether the color or intensity change and edge features are meaningful for the unclassified object. For example, if the edge feature is more persistent across the image data set (e.g., 30% recurrence frequency) compared to the color or intensity change (4% recurrence frequency), then the edge feature is an important distinguishing feature for the recognized object and is stored in the object model. If a feature is visible in 50% of the images, then the feature is useful for the recognized object because the feature is likely to be found when analyzing an unknown object, which improves the confidence level of that recognized object.

After the neural network programming of the host computer builds the recognized object database, the object recognition programming of the eyewear device 100 is executed. Execution of the programming by the processor 343 configures the eyewear device 100 to perform functions. The eyewear device 100 captures, via the camera 114, an image of the scene with the unknown object. The eyewear device 100 determines a recognized object-based adjustment; and produces visible output to the user via the graphical user interface presented on the image display (e.g., optical assembly 180A-B) of the eyewear device 100 based on the recognized object-based adjustment.

Determining the recognized object-based adjustment includes extracting object features of the unknown object from the captured image of the scene; and comparing the extracted unknown object features against a recognized object database to match the unknown object to a recognized object in the recognized object database. Each recognized object has a recognized object model that includes multiple recognized object features. The eyewear device 100 retrieves a recognized object-based adjustment for the recognized object.

To have a high confidence level that the unknown object is the recognized object, multiple (e.g., hundreds or thousands) of recognized object features for that recognized object may need to be found. However, to improve speed and efficiency, the object recognition programming may decide to short-circuit the procedure when, for example, 5-10 salient recognized object features are matched instead of all one-hundred or one-thousand features of the recognized object model for the recognized object.

The unknown object features can include a gradient, an edge, a contour, a shape, a ridge, a color, a corner, a blob (e.g., a region of pixels), or a color transition between a group of pixels. Unknown object features can also include a scale-invariant feature transform, an edge direction, changing pixel intensity, a template match, motion detection across multiple images, a Hough transform (e.g., line, circle/ellipse, arbitrary shape, etc.), a deformable parameterized shape, an active contour (e.g., snake), or a combination thereof. The unknown object features can be based on a feature extraction technique that represents interesting parts of the scene of the image with the object as a compact feature vector.

An edge is a boundary or set of points in the image, which can between two image regions with a one-dimensional structure. The edge may be of almost arbitrary shape, include junctions, and has a strong gradient magnitude. A corner is an interest point, which refers to point-like features in the image, which have a local two-dimensional structure. A blob describes an image structure in terms of a region, for example, a smooth area. A ridge is a one-dimensional curve that represents an axis of symmetry associated with each ridge point. Edge features can be detected using Canny, Sobel, Kayyali, Harris & Stephens, and smallest univalue segment assimilating nucleu (SUSAN) feature detectors. Corner features can be detected utilizing Harris & Stephens, SUSAN, Shi and Tomasi, Level curve curvature, features from accelerated segment test (FAST), Lapalacian of Gaussian, Difference of Gaussians, and Determinant of Hessian feature detectors. Blob features can be detected utilizing FAST, Lapalacian of Gaussian, Difference of Gaussians, Determinant of Hessian, maximally stable extremal regions (MSER), principal curvature-based region detector (PCBR), and Grey-level blobs feature detectors.

Feature detection and feature extraction are combined in the neural network programming of the host computer. Feature detection, feature extraction, and matching are combined in the object recognition programming of the eyewear device 100. Object features can be detected and, once detected, can be extracted. Object feature extractions result in a feature descriptor or a feature vector for each extracted unknown object feature. N-jets and local histograms (e.g., scale-invariant feature transform), Histogram of oriented gradients (HOG), Speeded-up robust features (SURF), Local binary patterns (LBP), Haar wavelets, Color histograms, etc. can be utilized to extract and represent features. To enhance runtime, the object recognition and neural network programming described herein may not determine and store location coordinates of the extracted object features because no need exists to overlay a graphic on the recognized object or pinpoint the exact location of the extracted object features. An unknown object can be matched to a recognized object as long as a threshold of enough unique distinguishing recognized object features is satisfied.

Object recognition programming of the eyewear device 100 runs repeatedly at certain time intervals, as long as the eyewear device 100 is powered and the user is active. Various optimizations to conserve battery power are implemented in the eyewear device 100. The image capture interval can be adjusted in order to optimize the power consumption. In one example, the object recognition programming is not run (e.g., executed) if the eyewear device 100 is running another application. In another example, the object recognition programming is not run if the environment is dark, for example, based on an ambient light sensor measurement. If no ambient light sensor is available in the eyewear device 100, the time interval between which the object recognition programming is run is increased. If no recognized objects are found in scenes over multiple images, the time interval between capturing images is also increased. If the eyewear device 100 finds a recognized object, the time interval may be extended to 10 seconds or more.

The recognized object-based adjustment includes launch, hide, or display (e.g., opening) of an application for the user to interact with or utilize. The recognized object-based adjustment includes display of a menu of applications related to the recognized object for execution (e.g., a hint). The recognized object-based adjustment includes control of a contextual notification to enable, disable, or restrict features of an application. The recognized object-based adjustment includes enable or disable of a system level feature. The recognized object-based adjustment may include a combination of the foregoing.

With the recognized object-based adjustment, the eyewear device 100 can launch or hint at various applications to create lightweight digital interactions. The lightweight digital interactions, for example, eliminate or bypass user gestures, manipulations, or other input to the user interface, which are typically necessary to interface with the recognized object, for example. When the recognized object is a thermostat, the recognized object-based adjustment launches or hints at a thermostat application to control the thermostat. When the recognized object is a light inside the house, the recognized object-based adjustment launches or hints at a lighting application to control the light inside the house. When the recognized object is a bill, check, or a receipt, the recognized object-based adjustment launches or hints at a payment application or a calculator. When the recognized object is a running shoe or other exercise equipment, the recognized object-based adjustment launches or hints at an exercise or fitness tracking application. When the recognized object is a television, the recognized object-based adjustment launches or hints at a video streaming application. When the recognized object is a vehicle, the recognized object-based adjustment launches or hints at a navigation application. When the recognized object is a home key, the recognized object-based adjustment launches or hints at home appliance control or security applications. When the recognized object is a vehicle, the recognized object-based adjustment launches or hints at vehicle applications. When the recognized object is a credit card, the recognized object-based adjustment launches or hints at a banking application.

With the recognized object-based adjustment, the eyewear device 100 can utilize context to improve contextual notifications. When the recognized object is a person that the user is speaking with, the recognized object-based adjustment queues notifications (e.g., text messages or emails) or does not display the notifications until the interaction with the recognized object completes. When the recognized object are weights or a treadmill in a gym, the recognized object-based adjustment queues or stops food related notifications from display until the interaction with the recognized object completes.

System level actions are also facilitated with the recognized object-based adjustment. When the recognized object is indoors, the recognized object-based adjustment places the eyewear device 100 in silent mode until the interaction with the recognized object completes. When the recognized object is a room with people inside, the recognized object-based adjustment places a digital virtual assistant of the eyewear device 100 in silent mode or turns off a phone ringer. When the recognized object is an airplane seat or an airport, the recognized object-based adjustment places the eyewear device 100 in airplane mode by disabling cellular service.

Figure 3A:
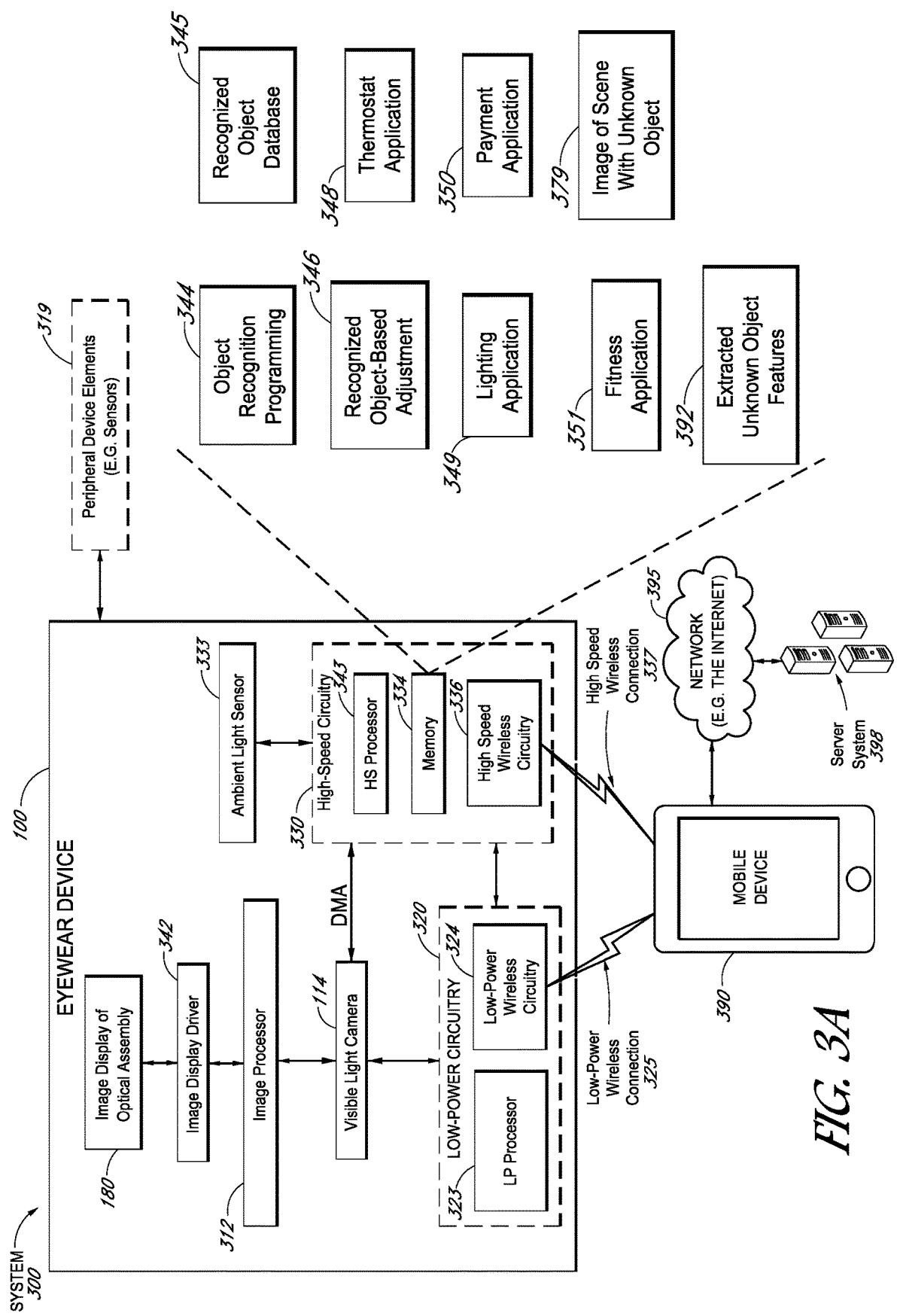
FIG. 3A is a high-level functional block diagram of an example object recognition system including the eyewear device, a mobile device, and a server system connected via various networks.
Figure 3B:
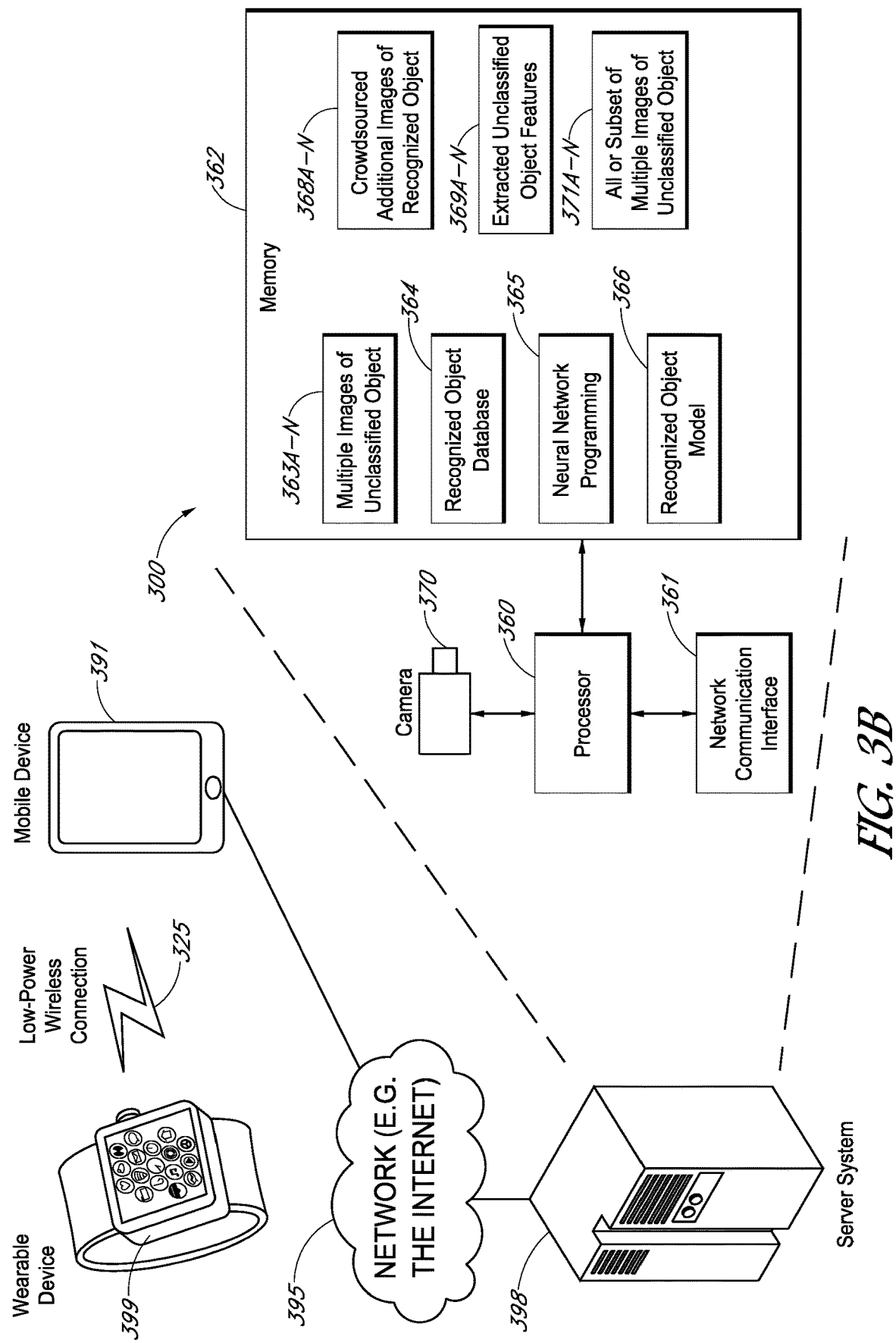
FIG. 3B shows an example of a hardware configuration for the server system of the object recognition system of FIG. 3A, in simplified block diagram form.
Figure 3C:
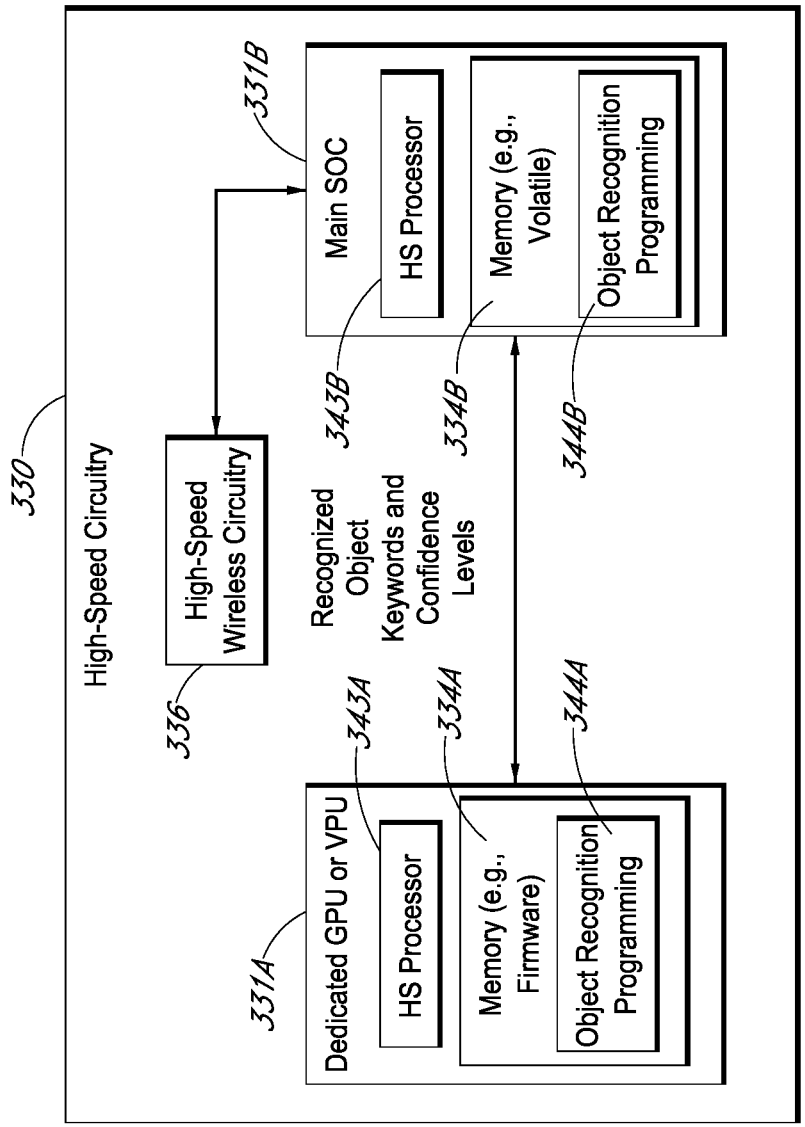
FIG. 3C shows an example of an optimized hardware architecture configuration for the high-speed circuitry of the eyewear device of the object recognition system of FIGS. 3A-B, in simplified block diagram form.

The foregoing functionality can be embodied in programming instructions found in one or more components of the system as further described in FIGS. 3A-C. For example, the neural network programming 365 of the system server 398 and the object recognition programming 344 of the eyewear device 100.

Figure 1B:
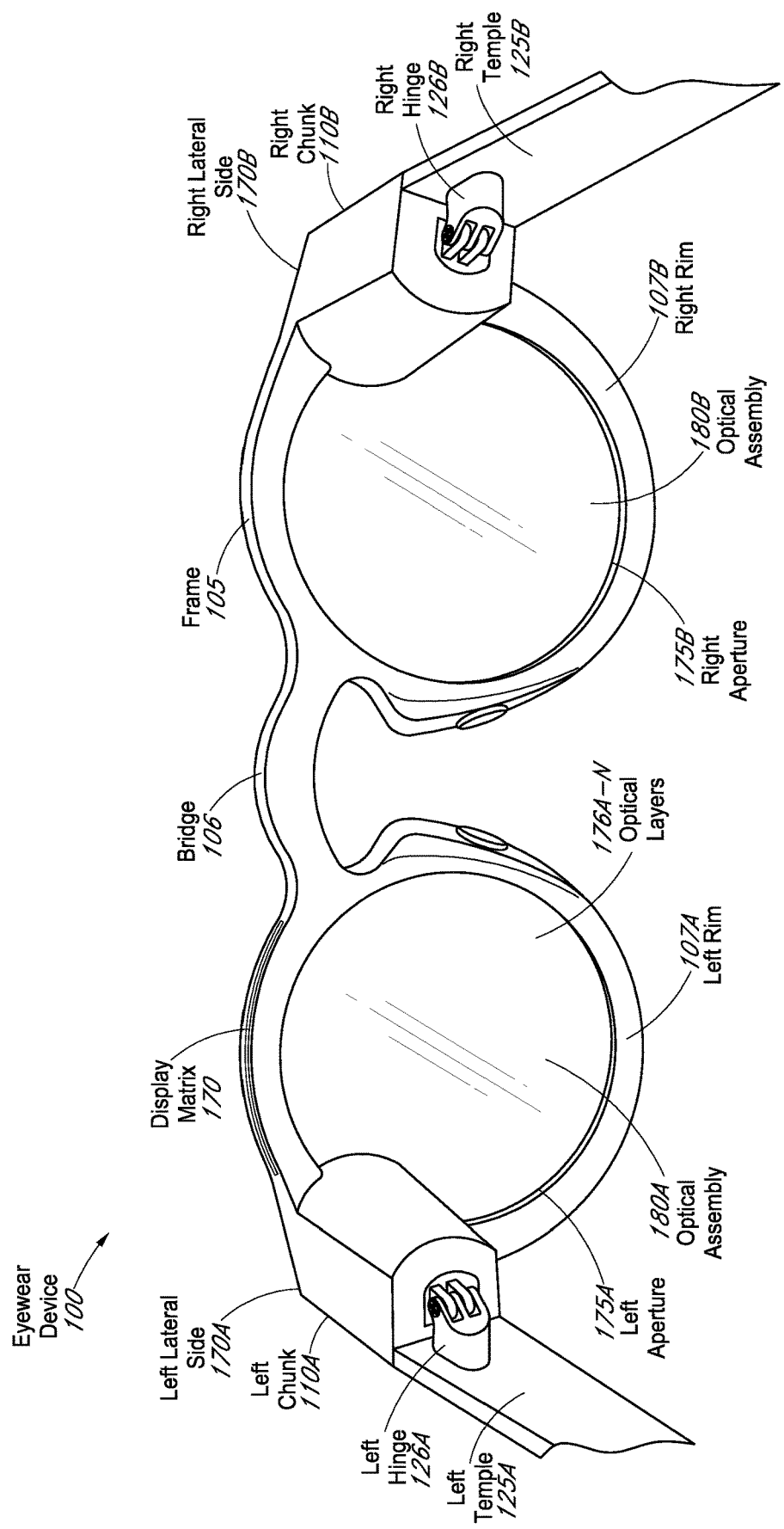
FIGS. 1B and 1C are rear views of example hardware configurations of the eyewear device of FIG. 1A, including two different types of image displays.
Figure 1C:
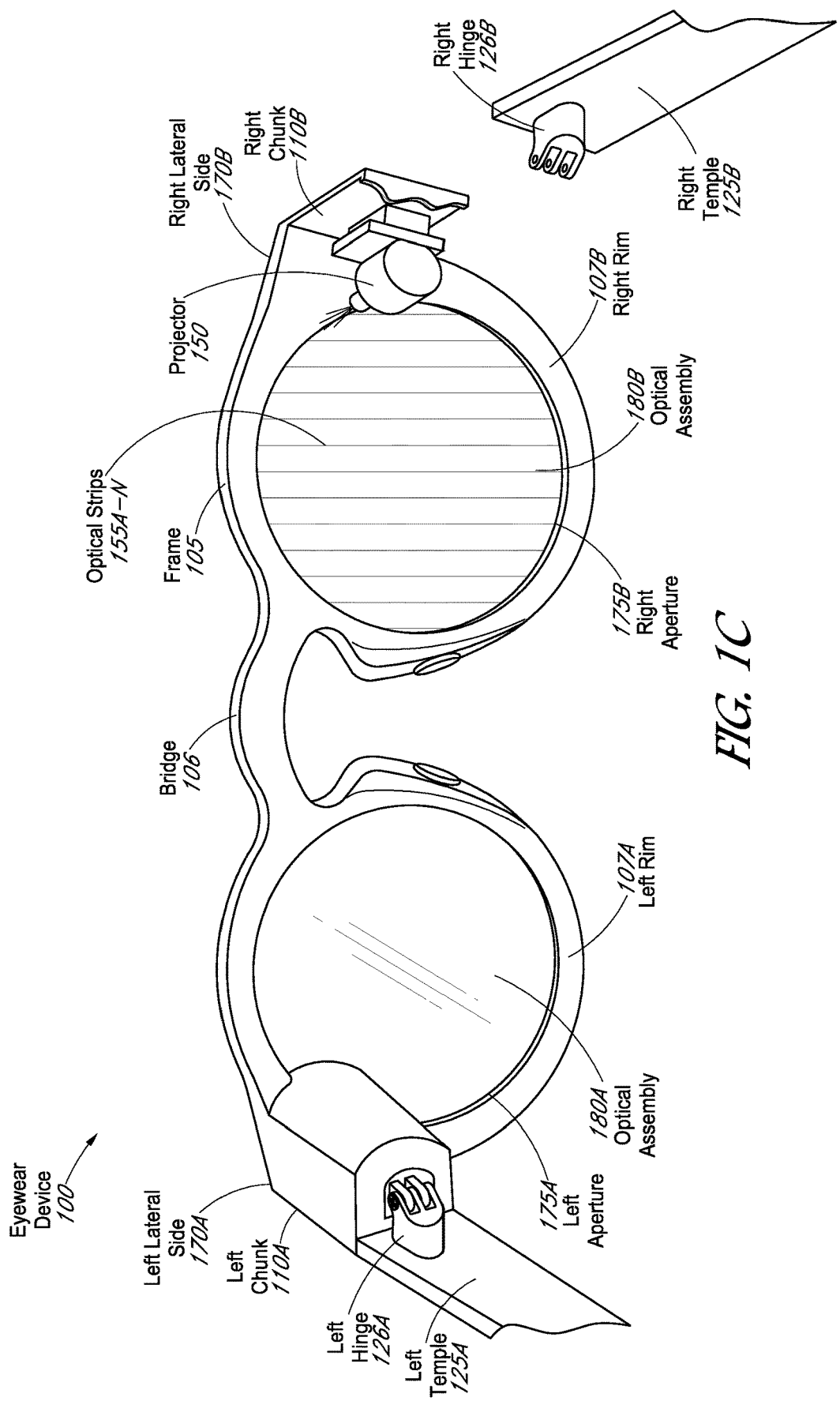

As shown in FIGS. 1A-C, the eyewear device 100 is in a form for wearing by a user, which are eyeglasses in the example of FIGS. 1A-C. The eyewear device 100 can take other forms and may incorporate other types of frameworks, for example, a headgear, a headset, or a helmet. In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical assembly 180A-B. Optical assembly 180A-B can include various optical layers 176A-N and an image display device. The left and right temples 125A-B extend from respective lateral sides of the frame 105, for example, via respective left and right chunks 110A-B. A substrate or materials forming the temple 125A-B can include plastic, acetate, metal, or a combination thereof. The chunks 110A-B can be integrated into or connected to the frame 105 on the lateral side.

FIGS. 1B-C are rear views of example hardware configurations of the eyewear device 100 of FIG. 1A, including two different types of image displays. In one example, the image display of optical assembly 180A-B includes an integrated image display. An example of such an integrated image display is disclosed in FIG. 5 of U.S. Pat. No. 9,678,338, filed Jun. 19, 2015, titled "Systems and Methods for Reducing Boot Time and Power Consumption in Wearable Display Systems," which is incorporated by reference herein. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1C. An example of a projection image display is disclosed in FIG. 6 of U.S. Pat. No. 9,678,338, filed Jun. 19, 2015, titled "Systems and Methods for Reducing Boot Time and Power Consumption in Wearable Display Systems," which is incorporated by reference herein. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the produced visible output on the optical assembly 180A-B of the eyewear device 100 may be a visible cue to guide the user to execute the recognized object-based adjustment. In another example, the produced visible output includes execution of the recognized object-based adjustment. In yet another example, the produced visible output includes a visible cue in response to execution of the recognized object-based adjustment to inform the user that the recognized object-based adjustment executed. The produced visible output can include a combination of the foregoing.

Figure 2:
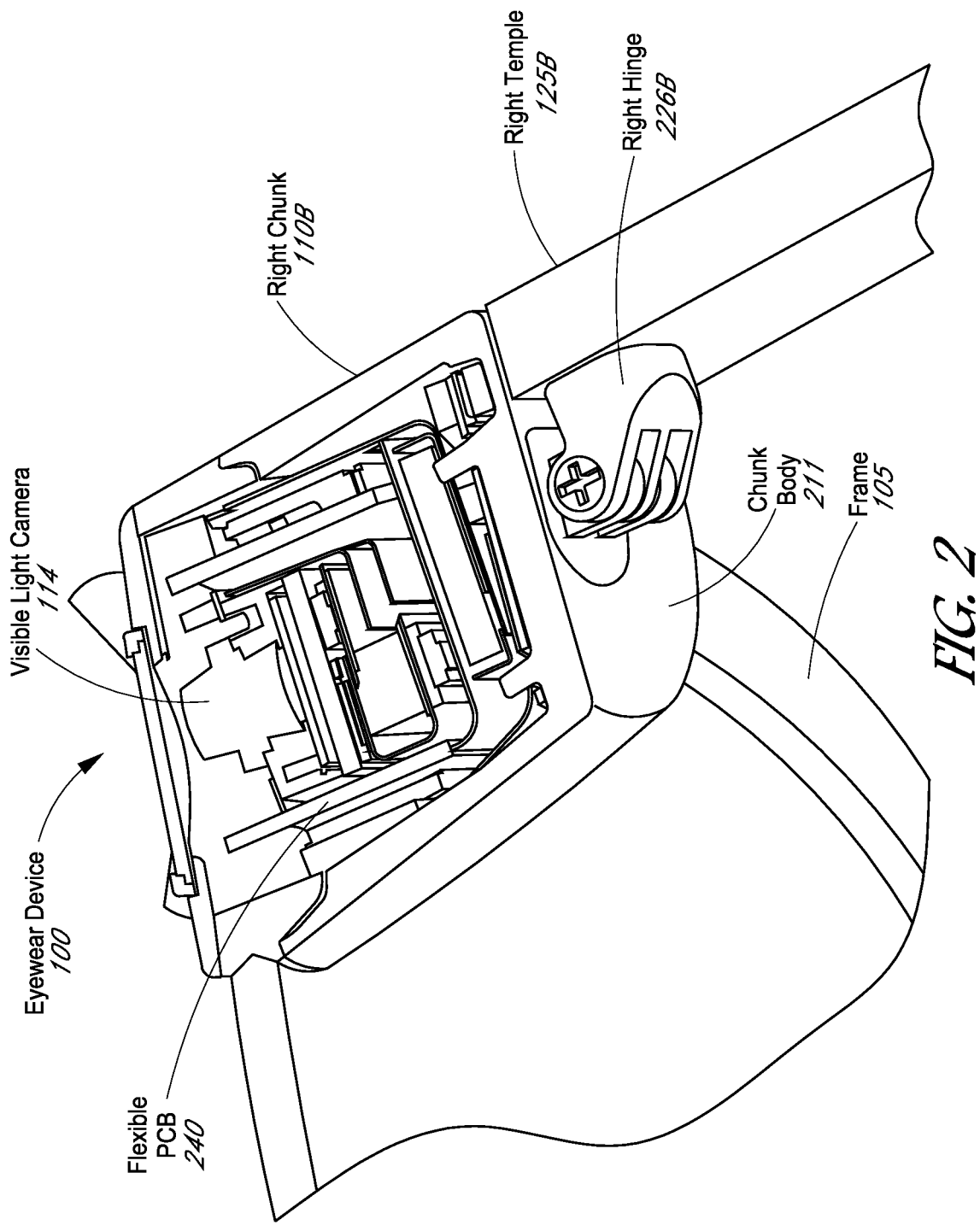
FIG. 2 is a top cross-sectional view of the chunk of the eyewear device of FIG. 1A depicting the visible light camera and a circuit board.

FIG. 2 is a top cross-sectional view of the right chunk 110B of the eyewear device 100 of FIG. 1A depicting the visible light camera 114 and a circuit board. As shown, the eyewear device 100 includes the visible light camera 114 and a circuit board, which may be a flexible printed circuit board (PCB) 240. The right chunk 110B is connected to a right temple 125B of the eyewear device 100 via the right hinge 226B. In some examples, components of the visible light camera 114, the flexible PCB 240, or other electrical connectors or contacts may be located on the right temple 125B or the right hinge 226B.

The right chunk 110B includes chunk body 211 and a chunk cap, but the chunk cap is removed in the cross-section of FIG. 2. Disposed inside the right chunk 110B are various interconnected circuit boards, such as PCBs or flexible PCBs, that include controller circuits for a visible light camera 114, microphone(s), low-power wireless circuitry (e.g., for wireless short-range network communication via Bluetooth™), high-speed wireless circuitry (e.g., for wireless local area network communication via WiFi).

The visible light camera 114 is coupled to or disposed on the flexible PCB 240 and covered by a visible light camera cover lens, which is aimed through opening(s) formed in the right chunk 110B. In some examples, the frame 105 connected to the right chunk 110B includes the opening(s) for the visible light camera cover lens. The frame 105 includes a front-facing side configured to face outwards away from the eye of the user. The opening for the visible light camera cover lens is formed on and through the front-facing side. In the example, the visible light camera 114 has an outwards facing field of view with a line of sight of the user of the eyewear device 100. The visible light camera cover lens can also be adhered to an outwards facing surface of the right chunk 110B in which an opening is formed with an outwards facing field of view, but in a different outwards direction. The coupling can also be indirect via intervening components.

Flexible PCB 240 is disposed inside the right chunk 110B and is coupled to one or more other components housed in the right chunk 110B. Although shown as being formed on the circuit boards of the right chunk 110B, the visible light camera 114 can be formed on the circuit boards of the left chunk 110A, the temples 125A-B, or frame 105.

FIG. 3A is a high-level functional block diagram of an example object recognition system 300. The object recognition system 300 includes a wearable device, which is the eyewear device 100 in the example. The wearable device can be a watch, wristband, or other portable device designed to be worn by a user to communicate via one or more wireless networks or wireless links with mobile device 390 or server system 398. The object recognition system 300 further includes a mobile device 390 and server system 398. Mobile device 390 may be a smartphone, tablet, laptop computer, access point, or any other such device capable of connecting with eyewear device 100 using both a low-power wireless connection 325 and a high-speed wireless connection 337. Mobile device 390 is connected to server system 398 and network 395. The network 395 may include any combination of wired and wireless connections.

Eyewear device 100 includes a, visible light camera 114, image display of the optical assembly 180, image display driver 342, image processor 312, low-power circuitry 320, and high-speed circuitry 330. The components shown in FIG. 3A for the eyewear device 100 are located on one or more circuit boards, for example a PCB or flexible PCB, in the temples. Alternatively or additionally, the depicted components can be located in the chunks, frames, hinges, or bridge of the eyewear device 100. Visible light camera 114 can include digital camera elements such as a complementary metal-oxide-semiconductor (CMOS) image sensor, charge coupled device, a lens, or any other respective visible or light capturing elements that may be used to capture data, including images of scenes with unknown objects. Memory 334 includes an image of a scene with an unknown object 379, extracted unknown object features 392, and a recognized object database 345. Memory 334 further includes object recognition programming 344 to perform the functions described herein, including the object recognition driven user-based interactions.

Object recognition programming 344 implements the object recognition instructions to cause the eyewear device 100 to capture, via the visible light camera 114, the image of the scene with the unknown object 379. Other implemented instructions cause the eyewear device 100 to determine the recognized object-based adjustment 346 and produce the visible output to the user via the graphical user interface. This visible output appears on the image display of optical assembly 180, which is driven by image display driver 342.

As shown in FIG. 3A, high-speed circuitry 330 includes high-speed processor 343, memory 334, and high-speed wireless circuitry 336. In the example, the image display driver 342 is coupled to the high-speed circuitry 330 and operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In certain embodiments, the high-speed processor 343 executes an operating system such as a LINUX operating system or other such operating system of the eyewear device 100 and the operating system is stored in memory 334 for execution. In addition to any other responsibilities, the high-speed processor 343 executing a software architecture for the eyewear device 100 is used to manage data transfers with high-speed wireless circuitry 336. In certain embodiments, high-speed wireless circuitry 336 is configured to implement Institute of Electrical and Electronic Engineers (IEEE) 802.11 communication standards, also referred to herein as Wi-Fi. In other embodiments, other high-speed communications standards may be implemented by high-speed wireless circuitry 336.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes any storage device capable of storing various data and applications, including, among other things, camera data generated by the visible light camera 114 and the image processor 312, as well as images generated for display by the image display driver 342 on the image display of the optical assembly 180. While memory 334 is shown as integrated with high-speed circuitry 330, in other embodiments, memory 334 may be an independent standalone element of the eyewear device 100. In certain such embodiments, electrical routing lines may provide a connection through a chip that includes the high-speed processor 343 from the image processor 312 or low-power processor 323 to the memory 334. In other embodiments, the high-speed processor 343 may manage addressing of memory 334 such that the low-power processor 323 will boot the high-speed processor 343 any time that a read or write operation involving memory 334 is needed.

As noted above, eyewear device 100 may include cellular wireless network transceivers or other wireless network transceivers (e.g., WiFi or Bluetooth™) and run sophisticated applications. The sophisticated applications are interacted with in a simplified manner as a result of the recognized object-based adjustment 346. Some of the illustrated applications may include a thermostat application 348 to a control a thermostat when the recognized object is a thermostat; and a lighting application 349 to control a light when then the recognized object is a light. Also shown are a payment application 350 to render payment when the recognized object is a bill, a check, or a receipt; and a fitness application 351 when the recognized is exercise equipment, such as a bicycle or running shoes. In one example, the memory 334 includes a shopping application or a web browser application to purchase a recognized object or provide pricing information of the recognized object.

Recognized object-based adjustments create a lightweight and simplified human-machine interface of the eyewear device 100 to perform specific actions in applications executing on the eyewear device 100. Once implemented, the recognized object-based adjustments enhance and simplify the user experience by taking actions in response to a recognized object, for example, launching or hinting at relevant applications. Instead of forcing the user to select from a menu of 50 applications, relevant options are shown at the very top of the graphical user interface. For example, the three most relevant applications loaded on the eyewear device 100 are displayed to reduce home screen clutter and reduce menu taps.

As further shown in FIG. 3B, server system 398 may be one or more computing devices as part of a service or network computing system, for example, that include a processor 360, a memory 362, and network communication interface 361 to communicate over the network 395 with the mobile device 390 and eyewear device 100. The memory 362 includes multiple images of an unclassified object 363A-N, a recognized object database 364, and neural network programming 365. Execution of the neural network programming 365 by the processor 360 configures the server system 398 to perform some or all of the functions described herein. Before execution of the object recognition programming 344 of the processor 343 of the eyewear device 100, server system 398 acquires the multiple images of the unclassified object 363A-N by, for example, capturing, via the camera 370 of the server system 398, all or a subset of the multiple images of the unclassified object 371A-N. The multiple images of the unclassified object 363A-N include different perspective views or angles of the unclassified object, lighting conditions, background scenes, or a combination thereof.

Neural network programming 365 builds a recognized object model 366 of the unclassified object based on the acquired multiple images 363A-N. For example, server system 398 receives, via the network communication interface 361, 100 images of a running shoe. Building the recognized object model 366 includes preprocessing the multiple images of the unclassified object 363A-N, which is a running shoe, to extract object features of the unclassified object from the multiple images. Unclassified object features include the gradient, the edge, the contour, the ridge, the color, the corner, the blob, or the combination thereof. Neural network programming 365 groups and stores the salient extracted unclassified object features 369A-N in the recognized object database 364 as the recognized object model 366 of the recognized object. A recognized object-based adjustment (e.g., fitness application 351 to launch) for when the running shoe object is recognized is stored with the recognized object model 366. The recognized object is associated with a keyword (e.g., a generic running shoe, running shoe manufacturer, etc.).

Neural network programming 365 implements a model classifier system for object models that is implemented separately from the object recognition programming 344 of the eyewear device 100. However, there are cases where the neural network programming 365 algorithm can improve the recognized object model 366 over time. If the mobile device 390 is paired with the eyewear device 100 over the lower-power wireless connection 325, then the user of the eyewear device 100 via the mobile device 39 distributes object features via a crowd-sourced algorithm implemented in the neural network programming 365. Many different users of mobile and wearable devices distribute object features via crowdsourcing back to the server system 398. In FIG. 3B, the other user of the illustrated smartwatch wearable device 399 paired with the tablet computer mobile device 391 propagates object features via the low-power wireless connection 325 to the mobile device 391, and those object features are then transmitted from the mobile device 391 back to the server system 398.

In one example, server system 398 receives, via the network 395, the image of the scene with the unknown object 379 from the eyewear device 100 via the mobile device 390; and further updates the recognized object model 366 of the recognized object based on the image of the scene with the unknown object 379 from the eyewear device 100. In another example, server system 398 connects, via the network communication interface 361, to the eyewear device 100 via the mobile device 390, the wearable device 399, or another computing device of a different user over the network 395. Server system 398 acquires the multiple images of the unclassified object 363A-N by receiving, via the network 395, all or a subset of the multiple images of the unclassified object 371A-N from the wearable device 399 or the mobile device 390, or the computing device of the different user. Server system 398 stores the received all or the subset of the multiple images of the unclassified object 371A-N in the memory 362 as the multiple images of the unclassified object 363A-N.

The crowd-sourced algorithm also feeds captured images and extracted unknown object features 392, which are not stored in the recognized object database 345 of the user devices, back to the server system 398 for storage when the unknown object is matched to the recognized object. Alternatively, if the unknown object is not correctly recognized, the user of the eyewear device 100, or other mobile and wearable devices 399 inputs the correct object classification. The correct object classification is transmitted to the server system 398 via the network 395 from the user devices.

The recognized object database 345 of the eyewear device 100 can be a mirror image of the recognized object database 364 of the server system 398. Recognized object database 345 of the eyewear device 100 is stored locally in a read-only memory (ROM), erasable programmable read-only memory (EPROM), or flash memory of high-speed circuitry 330. A firmware layer of the object recognition programming 344 returns a keyword corresponding to the recognized object and a confidence level that the unknown object is the recognized object to the application layer of the object recognition programming 344. Firmware resides below the operating system level and is more efficient which optimizes speed of execution by calling the hardware directly, for example. An application layer of the object recognition programming 344 determines the recognized-object based adjustment 346. Having the recognized-object based adjustment 346 determination reside in the application layer of the object recognition programming 344 allows dynamic changes to be made with updates distributed from the server system 398 via the networks 395, 337.

In some examples in which runtime is not deemed important, to allow for propagated updates to the recognized object database 345, firmware is not utilized for image processing and the entire logic of the object recognition programming 344 resides in the application layer in volatile type memory 334. The recognized object database 345 is stored locally in a volatile type memory 334 of the high-speed circuitry 330 to enable updates to the recognized object database 345, which are transmitted from the server system 398 via the networks 395, 337. For example, the server system 398 receives, via the network communication interface 361, crowdsourced additional images of the recognized object 368A-N from the wearable device 399 or the mobile device of a different user. Server system 398 updates the recognized object model 366 of the recognized object based on the crowdsourced additional images 368A-N of the recognized object. Updating the recognized object model 366 includes extracting and storing additional object features of the recognized object from the crowdsourced additional images 368A-N in the recognized object database 364 with the recognized object model 366 of the recognized object. Server system 398 then sends, via the network 395, just the updated recognized object model 366 or the entire recognized object database 364 to the eyewear device 100.

Firmware layer of object recognition programming 344 processes each image of a scene with an unknown object 379 one at a time and runs the image of the scene with the unknown object 379 through the models stored in the recognized object database 345 to return a keyword and confidence level in the recognized object(s). If there is continuity of recognized objects identified in multiple sequential images, the application layer of the object recognition programming 344 determines there is even higher confidence in the recognized object. Application layer of the object recognition programming 344 can optimize based on confidence level and prioritize certain keywords over others depending on confidence level. In some examples, the object recognition programming 344 of the eyewear device 100 processes multiple images of scenes with unknown objects to determine a set of recognized objects and overall confidence in those recognized objects across the multiple images.

Eyewear device 100 further includes an ambient light sensor 333 and detects, via the ambient light sensor 333, the illuminance of the environment in which the eyewear device 100 is located. The eyewear device 100 determines whether the detected illuminance of the environment exceeds an illuminance brightness threshold or is below an illuminance darkness threshold. Upon determining that the detected illuminance exceeds the illuminance brightness threshold or is below the illuminance darkness threshold, the eyewear device 100 throttles back the sampling interval of the capturing, via the camera 114, the image of the scene with the unknown object 379. The ambient light-based adjustment to the sampling interval for capturing the image of the scene with the unknown object 379 may be implemented in the application layer of the object recognition programming 344. Although not shown, eyewear device 100 can also include a proximity sensor, which detects whether or not the user is currently wearing the eyewear device 100, to optimize power consumption.

Eyewear device 100 is connected with a host computer. For example, the eyewear device 100 is paired with the mobile device 390 via the high-speed wireless connection 337 or connected to the server system 398 via the network 395. In one example, eyewear device 100 captures, via the camera 114, the image of the scene with the unknown object 379 and sends the image of the scene with the unknown object 379 to the host computer. The host computer determines the recognized object-based adjustment 346 and sends the recognized object-based adjustment 346 to the eyewear device 100 via the high-speed wireless connection 337 in response to receiving the image of the scene with the unknown object 379. Eyewear device receives the recognized object-based adjustment 346 and, in response to receiving the recognized-object based adjustment 346, eyewear device 100 produces the visible output to the user via the graphical user interface on the image display of optical assembly 180.

Output components of the eyewear device 100 include visual components, such as the image display of optical assembly 180 as described in FIGS. 1B-C (e.g., a display such as a liquid crystal display (LCD), a plasma display panel (PDP), a light emitting diode (LED) display, a projector, or a waveguide). The image display of the optical assembly 180 is driven by the image display driver 342. The output components of the eyewear device 100 further include acoustic components (e.g., speakers), haptic components (e.g., a vibratory motor), other signal generators, and so forth. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Object recognition system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the object recognition system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

FIG. 3C shows an example of an optimized hardware architecture configuration for the high-speed circuitry 330 of the eyewear device 100 of the object recognition system 300 of FIG. 3A, in simplified block diagram form. As noted above, to enhance runtime optimization and speed of execution, the object recognition programming 344 includes a subset of instruction in firmware and another subset of instructions in the application layer. In this example of FIG. 3C, an additional optimization is shown. The instructions of extracting object features of the unknown object from the image of the scene with the unknown object 379 and comparing the extracted unknown object features 392 against the recognized object database 345 are embedded in firmware of a separate dedicated system on a chip (SOC).

As shown in FIG. 3C, the high-speed circuitry 330 of the eyewear device 100 includes at least two systems on a chip (SOCs) 331A-B. The first SOC 331A is a dedicated graphics processing unit (GPU) or a vision processing unit (VPU), which includes a first processor 343A; a first memory 334A (e.g., firmware); and firmware programming in the first memory 334A. Execution of the firmware layer of the object recognition programming 344A by the first processor 343A of the dedicated GPU or VPU 331A configures the eyewear device 100 to: capture, via the visible light camera 114, the images of the scene with the unknown object; extract features of the unknown object from the image 379; and compare the extracted unknown object features 392 against the recognized object database 345. The high-speed circuitry 330 further includes another second system on a chip (SOC) unit 331B. The second SOC 331B of the high-speed circuitry 330 is a main SOC which includes a second processor 343B, a second memory 334B, and application layer of object recognition programming 344B in the second memory 334B. Execution of the application layer of the object recognition programming 344B by the second processor 343B configures the eyewear device 100 to retrieve the recognized object-based adjustment and produce the visible output to the user via the graphical user interface. The dedicated GPU or VPU SOC 331B of the high-speed circuitry 330 has access to the visible light camera 114 via direct memory access (DMA). Firmware layer of the object recognition programming 344A implemented in the dedicated GPU or VPU SOC 331B repeatedly returns keywords of the recognized objects and confidence levels to the main SOC 331B. The application layer of the object recognition programming 344B of the main SOC 331B determines the recognized object-based adjustment 346 based on the returned keywords and confidence levels and produces the visible output for triggering updates to the graphical user interface on the image display of optical assembly 180.

Object recognition programming 344 may execute only locally on the eyewear device 100 while the visible light camera 114 is powered on to allow for improved response time, efficiency, and responsiveness of the graphical user interface. When visible light camera 114 starts running, an image of the scene with the unknown object 379 is captured every 1 second. If a recognized object is not matched after 5 seconds, another image of a scene with an object is captured every 2.5 seconds. If a recognized object is still not matched after 20 seconds, the interval for capturing an image of a scene with an object 379 is increased to every 20 seconds. Other adjustments to the frequency of capturing the image of the scene with the object 379 can be made to improve power conservation. Also, instructions implemented in the object recognition programming 344 can be divided up over various system components to conserver power of the eyewear device 100. For example, the captured image of the scene with the unknown object 379 is transmitted to the mobile device 390 or server system 398 to extract object features and retrieve the recognized object-based adjustment to reduce power consumption of the eyewear device 100.

If the object recognition programming 344 is implemented on a mobile device 390, access to firmware may not be obtained. Hence, the object recognition programming 344 runs entirely at the application layer, in some instances, may run on a GPU if the manufacturer of the mobile device 390 provides access.

In one example embodiment, image processor 312 comprises a microprocessor integrated circuit (IC) customized for processing image sensor data from the visible light camera 114, along with volatile memory used by the microprocessor to operate. In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In certain embodiments, minimal processing of the camera signal from the visible light camera 114 is performed by the image processor 312, and additional processing may be performed by applications operating on the mobile device 390 or server system 398.

Low-power circuitry 320 includes low-power processor 323 and low-power wireless circuitry 324. These elements of low-power circuitry 320 may be implemented as separate elements or may be implemented on a single IC as part of a system on a single chip. Low-power processor 323 includes logic for managing the other elements of the eyewear device 100. Low-power processor 323 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other embodiments, other low power communication systems may be used.

Figure 4:
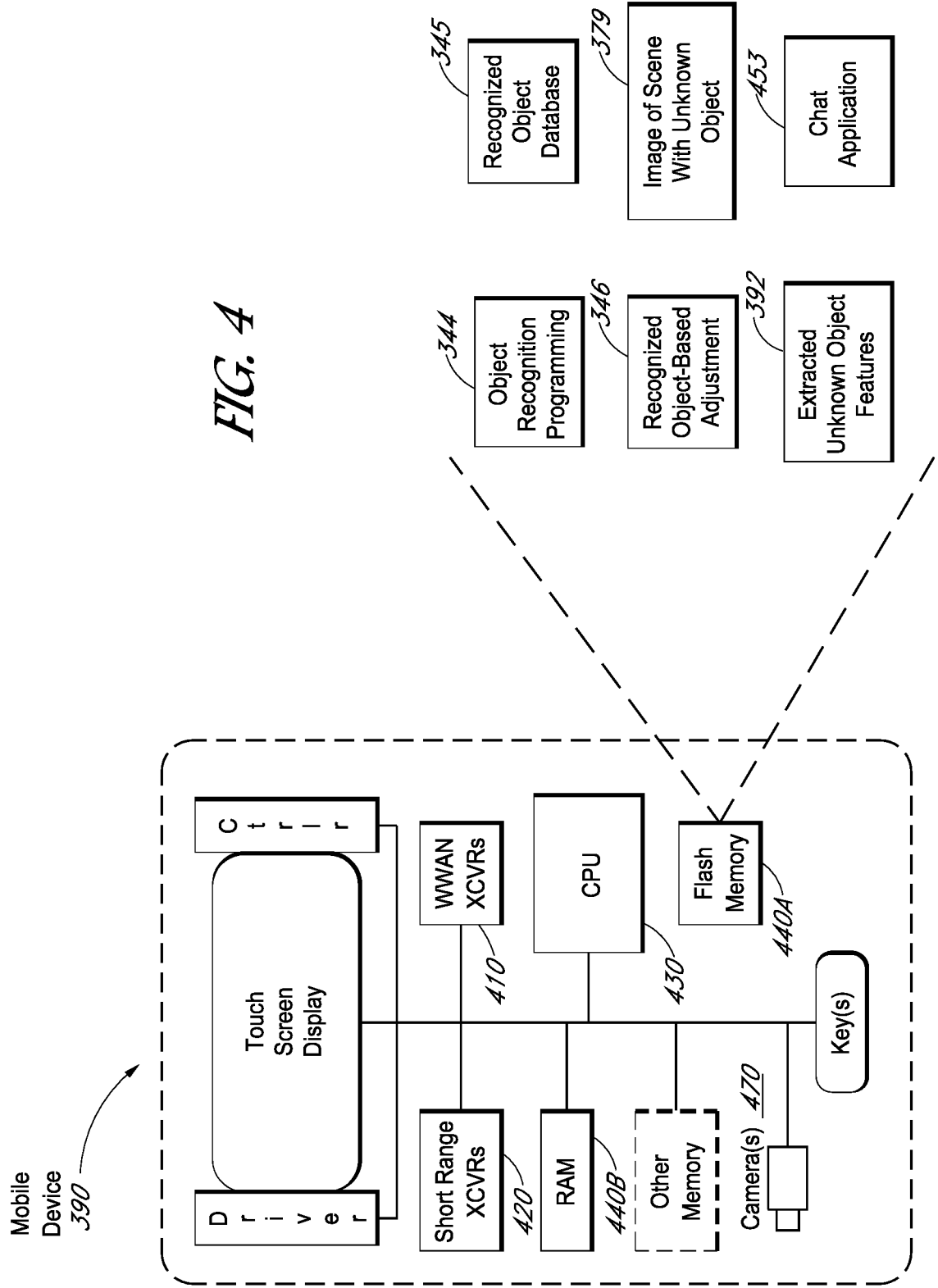
FIG. 4 shows an example of a hardware configuration for the mobile device of the object recognition system of FIGS. 3A-B, in simplified block diagram form.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

FIG. 4 is a high-level functional block diagram of an example of a mobile device 390 that communicates via the object recognition system 300 of FIGS. 3A-B. Shown are elements of a touch screen type of mobile device 390 having object recognition programming 344 loaded, although other non-touch type mobile devices can be used in the object recognition human-machine interface communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s).

The activities that are the focus of discussions here typically involve data communications related to recognized object-based adjustment to a user interface in a wearable device (e.g., eyewear device 100) or the mobile device 390. As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

Several of these types of communications through the transceivers 410, 420 and a network, as discussed previously, relate to protocols and procedures in support of communications with the eyewear device 100 or the server system 398 for object recognition. Such communications, for example, may transport packet data via the short range XCVRs 420 over the wireless connections 325 and 337 to and from the eyewear device 100 as shown in FIGS. 3A-C. Such communications, for example, may also transport data utilizing IP packet data transport via the WWAN XCVRs 410 over the network (e.g., Internet) 395 shown in FIGS. 3A-C. Both WWAN XCVRs 410 and short range XCVRs 420 connect through radio frequency (RF) send-and-receive amplifiers (not shown) to an associated antenna (not shown).

The mobile device 390 further includes a microprocessor, shown as CPU 430, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to object recognition communications with the eyewear device 100 and server system 398. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g. as a working data processing memory. The flash memory 440A typically provides longer term storage.

Hence, in the example of mobile device 390, the flash memory 440A is used to store programming or instructions for execution by the processor 430 to implement the functions described herein for object recognition. Depending on the type of device, the mobile device 390 stores and runs a mobile operating system through which specific applications, which may include the object recognition programming 344 are executed. However, in some implementations, the object recognition programming 344 and recognized object database 345 may be implemented in firmware or a combination of firmware and an application layer as described with the eyewear device 100. For example, the instructions to capture the image of the scene with the unknown object 379, extract object features of the unknown object, and compare the extracted unknown object features 392 against the recognized object database 345 reside in firmware (e.g., with a dedicated GPU or VPU SOC) like that described with the eyewear device in FIGS. 3A-C. Instructions to retrieve the recognized object-based adjustment 346 and produce the visible output to the user via the graphical user interface may reside in an application. Applications, like the application layer of object recognition programming 344 and other applications, may be a native application, a hybrid application, or a web application (e.g., a dynamic web page executed by a web browser) that runs on mobile device 390. The object recognition programming 344 implemented on the mobile device 390 implements recognized object-based adjustments to produce visible output on a graphical user interface presented on the touch screen display on the mobile device 390 in a manner similar to the eyewear device 100. Examples of mobile operating systems include Google Android, Apple iOS (I-Phone or iPad devices), Windows Mobile, Amazon Fire OS, RIM BlackBerry operating system, or the like. As further shown, the mobile device includes a chat application 453, which is described below in FIG. 5.

Figure 5:
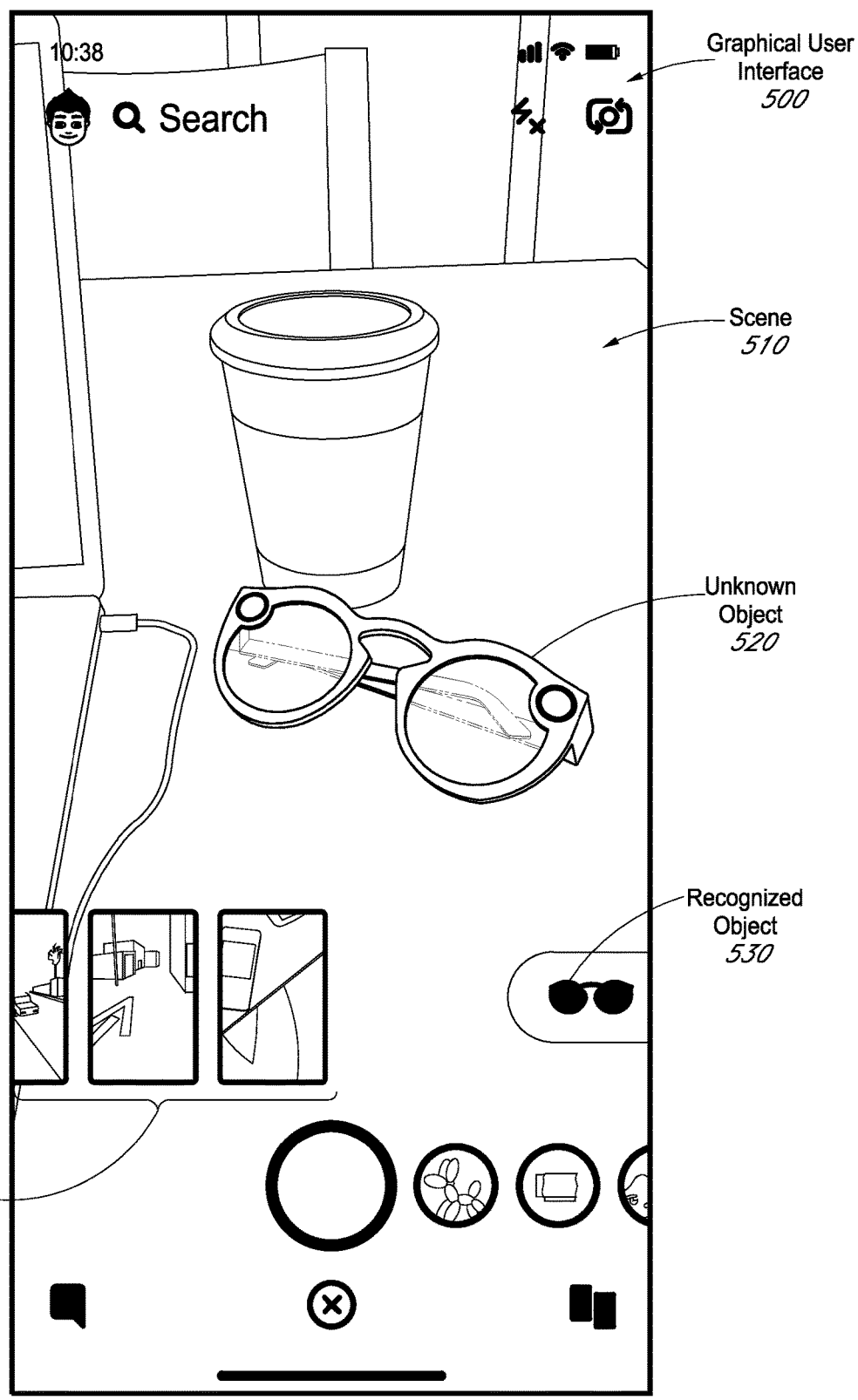
FIG. 5 illustrates an example of launching an application on the eyewear device based on a recognized object.

FIG. 5 illustrates an example of launching an application on the mobile device 390 based on a recognized object. As shown, the camera 470 of the mobile device 390 captures an image of a scene 510. Scene 510 includes an unknown object 520, which is a smartglasses type of eyewear device 100. Object features of the unknown object 520 are extracted and compared against the recognized object database 345 to match the recognized object 530, which is the smartglasses type of eyewear device 100.

The recognized-object based adjustment 540 is retrieved, which is the launching of a chat application 453 with a menu. The recognized-object based adjustment 540 automatically loads the three depicted photos stored on the recognized object 530 for viewing in the chat application 453 launched on the mobile device 390, to allow the user to interact with the recognized object 530. Visible output is produced in the graphical user interface 500 of the mobile device 390 with the chat application 453 presented on the touch screen display of the mobile device 390. The recognized object-based adjustment 540 reduces the number of taps required by the user to access the three depicted photos on the recognized object 530 for viewing on the mobile device 390. Viewing the photos is a mere one tap (pointing the mobile device and pressing the snap photo button), instead of three taps (tap 1: launching the chat application 453; tap 2: connecting to the smartglasses; and tap 3: selecting the view stored photos menu option).

Figure 6:
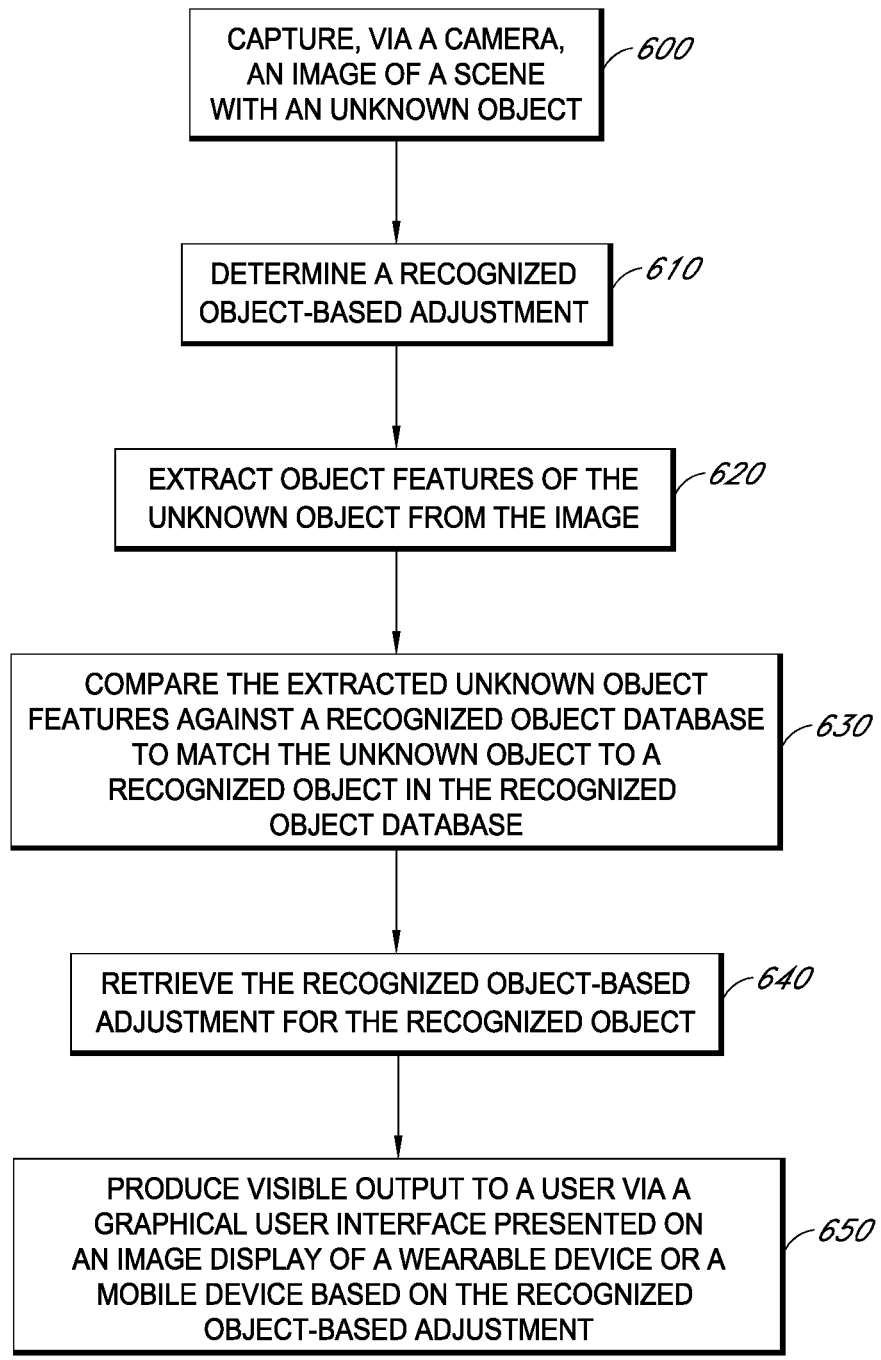
FIG. 6 is a flowchart of the operation of a wearable device or a mobile device and other components of the object recognition system of FIGS. 3A-C.

FIG. 6 is a flowchart of the operation of a wearable device (e.g., an eyewear device 100 or other wearable device 399) or a mobile device 390 and other components of the object recognition system 300. A human-machine interface of wearable and mobile devices can be simplified to create lightweight interactions with the user according to the protocols and procedures of the object recognition system 300. Although shown as occurring serially, the blocks of FIG. 6 may be reordered or parallelized depending on the implementation.

Beginning in block 600, the wearable device or the mobile device captures, via a camera, an image of a scene with an unknown object. Proceeding to block 610, the wearable device or the mobile device determines a recognized object-based adjustment. As shown in block 620, determining the recognized object-based adjustment includes extracting object features of the unknown object from the captured image of the scene. The unknown object features including a gradient, an edge, a contour, a ridge, a color, a corner, a blob, or a combination thereof. Blocks 600, 610, and 620 were described in detail above in the text associated with FIGS. 1A-C, 3A-C, 4, and 5, for example, with reference to the object recognition programming 344.

Continuing to block 630, determining the recognized object-based adjustment further includes comparing the extracted unknown object features against a recognized object database to match the unknown object to a recognized object in the recognized object database. Each recognized object has a recognized object model that includes multiple recognized object features. Comparing the extracted unknown object features against the recognized object database includes comparing similarity of the extracted unknown object features to the multiple recognized object features of the recognized object model belonging to the recognized object. Comparing the extracted unknown object features against the recognized object database further includes matching the recognized object upon determining that a distinguishing feature threshold of the recognized object is satisfied. The distinguishing feature threshold is stored in the recognized object database with the recognized object model of the recognized object. Comparison of the extracted unknown object features against the recognized object database is repeatedly executed as each unknown object feature is extracted from the image of the scene with the unknown object. Upon determining that the distinguishing feature threshold of the recognized object is satisfied, features extraction of the unknown object is terminated.

Moving to block 640, determining the recognized object-based adjustment further includes retrieving the recognized object-based adjustment for the recognized object. The recognized object-based adjustment includes launch, hide, or display of an application for the user to interact with or utilize. The recognized object-based adjustment can further include display of a menu of applications related to the recognized object for execution. The recognized object-based adjustment can further include control of a contextual notification to enable, disable, or restrict features of an application. The recognized object-based adjustment can further include enable or disable of a system level feature or a combination of the foregoing types of adjustments. Finishing in block 650, the wearable device or the mobile device produces visible output to a user via a graphical user interface presented on an image display of the wearable device or the mobile device based on the recognized object-based adjustment.

Any of the recognized object-based adjustment functions described herein for the eyewear device 100, mobile device 390, and server system 398 can be embodied in on one or more methods as method steps or in one more applications as described previously. According to some embodiments, an "application," "applications," or "firmware" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for the fingerprint sensor, user authorization, navigation, or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device, including:
   a frame;
   an image display to present a graphical user interface to a user;
   a camera connected to the frame to capture an image of a scene with an unknown object;
   a processor connected to the camera;
   a memory accessible to the processor; and
   programming in the memory, wherein execution of the programming by the processor causes the processor to perform operations including:
   capturing, via the camera, the image of the scene with the unknown object;
   determining a recognized object-based adjustment of an application with which the user is interacting by:
      extracting object features of the unknown object from the captured image of the scene, the unknown object features including at least one of a gradient, an edge, a contour, a ridge, a color, a corner, a blob, or a combination thereof;
      comparing the extracted unknown object features against a recognized object database to match the unknown object to a recognized object in the recognized object database, wherein each recognized object has a recognized object model that includes multiple recognized object features; and
      retrieving the recognized object-based adjustment of the application for the recognized object; and
   producing visible output to the user via the graphical user interface presented on the image display of the eyewear device based on the recognized object-based adjustment of the application.

2. The eyewear device of claim 1, wherein the application comprises a chat application, and wherein execution of the programming by the processor further causes the processor to perform operations comprising launching the chat application with a menu, loading at least one photo for viewing in the chat application to allow the user to interact with the recognized object, and presenting the visible output via the chat application to the graphical user interface, wherein the at least one photo is viewed with one tap to select the at least one photo.

3. The eyewear device of claim 1, wherein the recognized object comprises a thermostat and the recognized object-based adjustment launches or hints at a thermostat application to control the thermostat.

4. The eyewear device of claim 1, wherein the recognized object comprises a light inside a house and the recognized object-based adjustment launches or hints at a lighting application to control light inside the house.

5. The eyewear device of claim 1, wherein the recognized object comprises a bill, check, or receipt and the recognized object-based adjustment launches or hints at a payment application or a calculator.

6. The eyewear device of claim 1, wherein the recognized object comprises a running shoe or exercise equipment and the recognized object-based adjustment launches or hints at an exercise or fitness tracking application.

7. The eyewear device of claim 1, wherein the recognized object comprises a television and the recognized object-based adjustment launches or hints at a video streaming application.

8. The eyewear device of claim 1, wherein the recognized object comprises a vehicle and the recognized object-based adjustment launches or hints at a vehicle or navigation application.

9. The eyewear device of claim 1, wherein the recognized object comprises a home key and the recognized object-based adjustment launches or hints at a home appliance control or security application.

10. The eyewear device of claim 1, wherein the recognized object comprises a credit card and the recognized object-based adjustment launches or hints at a banking application.

11. The eyewear device of claim 1, wherein the recognized object-based adjustment of the application includes:
launch, hide, or display of the application for the user to interact with or to utilize;
display of a menu of applications related to the recognized object for execution;
control of a contextual notification to enable, disable, or restrict features of the application;
enable or disable of a system level feature of the application; or
a combination thereof.

12. The eyewear device of claim 11, wherein the produced visible output includes:
a visible cue to guide the user to execute the recognized object-based adjustment of the application;
execution of the recognized object-based adjustment of the application;
a visible cue in response to execution of the recognized object-based adjustment of the application to inform the user that the recognized object-based adjustment of the application has executed; or
a combination thereof.

13. The eyewear device of claim 12, wherein:
execution of the programming by the processor configures the eyewear device to perform functions, including a function to execute the recognized object-based adjustment of the application; and
the function to produce the visible output to the user via the graphical user interface presented on the image display of the eyewear device based on the recognized object-based adjustment of the application is the visible cue in response to execution of the recognized object-based adjustment of the application to inform the user of execution of the recognized object-based adjustment of the application.

14. An eyewear device, including:
a frame;
an image display to present a graphical user interface to a user;
a camera connected to the frame to capture an image of a scene with an unknown object;
a processor coupled to the eyewear device and connected to the camera;
a memory accessible to the processor; and
programming in the memory, wherein execution of the programming by the processor causes the processor to perform operations including:
capturing, via the camera, the image of the scene with the unknown object;
determining a recognized object-based adjustment of an application with which the user is interacting by:
executing firmware programming adapted to extract object features of the unknown object from the captured image of the scene, the unknown object features including a gradient, an edge, a contour, a ridge, a color, a corner, a blob, or a combination thereof and to compare the extracted unknown object features against a recognized object database to match the unknown object to a recognized object in the recognized object database, wherein each recognized object has a recognized object model that includes multiple recognized object features, and
executing application level programming that retrieves the recognized object-based adjustment of the application for the recognized object; and
producing visible output to the user via the graphical user interface presented on the image display of the eyewear device based on the recognized object-based adjustment of the application.

15. The eyewear device of claim 14, wherein the processor comprises a first processor and a second processor and the memory comprises a first memory and a second memory, further comprising:
a graphics processing unit or a vision processing unit, including:
the first processor;
the first memory; and
firmware programming in the first memory, wherein execution of the firmware programming by the first processor configures the eyewear device to perform the functions to extract features of the unknown object from the image; and
a system on a chip unit, including:
the second processor;
the second memory; and
application layer programming in the second memory, wherein execution of the application layer programming by the second processor configures the eyewear device to perform the function to compare the extracted unknown object features against the recognized object database.

16. The eyewear device of claim 15, wherein the first processor executes object recognition programming that configures the eyewear device to perform the functions to:
capture, via the camera, the image of the scene with the unknown object;
determine the recognized object-based adjustment of the application; and
produce the visible output to the user via the graphical user interface.

17. The eyewear device of claim 16, further comprising a network communication interface, wherein execution of the programming by the first processor configures the eyewear device to perform further functions to:
send, via the network communication interface, the image of the scene with the unknown object to a mobile device in response to capturing the image of the scene with the unknown object;
receive the recognized object-based adjustment of the application from the mobile device; and
produce the visible output to the user via the graphical user interface in response to receiving the recognized object-based adjustment of the application.

18. A non-transitory computer-readable medium comprising instructions that when executed by one or more processors caused the one or more processors to perform operations comprising:
capturing, via a camera, an image of a scene with an unknown object;
determining a recognized object-based adjustment of an application with which a user is interacting by:
extracting object features of the unknown object from the captured image of the scene, the unknown object features including a gradient, an edge, a contour, a ridge, a color, a corner, a blob, or a combination thereof;
comparing the extracted unknown object features against a recognized object database to match the unknown object to a recognized object in the recognized object database, wherein each recognized object has a recognized object model that includes multiple recognized object features; and retrieving the recognized object-based adjustment of the application for the recognized object; and producing visible output to the user via a graphical user interface presented on an image display of a wearable device or a mobile device based on the recognized object-based adjustment of the application.

19. The computer-readable medium of claim 18, further comprising instructions that when executed by one or more processors caused the one or more processors to perform operations comprising:

launching, hiding, or displaying of an application for the user to interact with or utilize;

displaying of a menu of applications related to the recognized object for execution;

controlling of a contextual notification to enable, disable, or restrict features of an application;

enabling or disabling of a system level feature; or a combination thereof.

20. The computer-readable medium of claim 18, further comprising instructions that when executed by one or more processors caused the one or more processors to perform operations comprising:

comparing similarity of the extracted unknown object features to the multiple recognized object features of the recognized object model belonging to the recognized object;

matching the recognized object upon determining that a distinguishing feature threshold of the recognized object is satisfied; and storing the distinguishing feature threshold in the recognized object database with the recognized object model of the recognized object.

\* \* \* \* \*